(12) United States Patent
Rajauria et al.

(10) Patent No.: US 10,014,668 B2
(45) Date of Patent: Jul. 3, 2018

(54) SWITCHGEAR ENCLOSURE WITH INTERCONNECTED EXHAUST SYSTEM

(71) Applicant: General Electric Company, Schenectady, NY (US)

(72) Inventors: Samir Rajauria, Uttar Pradesh (IN); Steven Edward Meiners, Fuquay-Varina, NC (US); Hao Wu, Shanghai (CN); Ayyappa Reddy Jakkireddy, Telangana (IN); Guru Moorthy Kurra, Telangana (IN)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 0 days.

(21) Appl. No.: 15/435,263

(22) Filed: Feb. 16, 2017

(65) Prior Publication Data

US 2017/0256922 A1    Sep. 7, 2017

(30) Foreign Application Priority Data

Mar. 7, 2016    (CN) .......................... 2016 1 0126658

(51) Int. Cl.
| | |
|---|---|
| *H02B 1/56* | (2006.01) |
| *H02B 13/00* | (2006.01) |
| *H02B 5/06* | (2006.01) |

(52) U.S. Cl.
CPC .......... *H02B 1/565* (2013.01); *H02B 13/005* (2013.01); *H02B 5/06* (2013.01)

(58) Field of Classification Search
CPC ...... H02B 13/025; H02B 13/035; H02B 5/06; H02B 1/22; H02B 1/20; H02B 1/26;
(Continued)

(56) References Cited

U.S. PATENT DOCUMENTS

| | | | |
|---|---|---|---|
| 3,965,452 | A | 6/1976 | Chabala et al. |
| 4,001,750 | A | 1/1977 | Scherer et al. |

(Continued)

FOREIGN PATENT DOCUMENTS

| | | |
|---|---|---|
| CN | 103444029 A | 12/2013 |
| DE | 3013756 A1 | 10/1981 |

(Continued)

OTHER PUBLICATIONS

Centerline 2100 Motor Control Centers Selection Guide, Rockwell Automation, pp. 1-76, Jul. 2015.

*Primary Examiner* — Adam B Dravininkas
(74) *Attorney, Agent, or Firm* — GE Global Patent Operation; Steven G. Midgley (57) ABSTRACT

A switchgear enclosure is provided. The switchgear enclosure includes a plurality of switchgear panels and a plurality of ducts extending through the switchgear panels. Each switchgear panel includes an exterior housing, a busbar compartment defined within the exterior housing, and an exhaust system. The busbar compartment surrounds a busbar extending through the switchgear panel. The exhaust system includes a vent path structure configured within the exterior housing to at least partially surround the busbar compartment, a first channel defined between the vent path structure and the exterior housing, and a first vent opening formed on the vent path structure. The first vent opening directs arc gases within said busbar compartment to the first channel. The ducts are in fluid communication with the first channels of the switchgear panels to distribute arc gases between the first channels.

20 Claims, 10 Drawing Sheets

(58) Field of Classification Search
CPC ...... H02B 13/02; H02B 1/56; H02B 13/0352; H02B 13/055; H02B 1/00; H02B 1/565; H01H 31/003; H01H 33/666
See application file for complete search history.

(56) References Cited

U.S. PATENT DOCUMENTS

| | | | |
|---|---|---|---|
| 5,689,097 A | 11/1997 | Aufermann et al. | |
| 6,417,443 B1 | 7/2002 | Smith | |
| 6,960,736 B1* | 11/2005 | Bach | H01H 9/342 |
| | | | 200/306 |
| 7,368,679 B2 | 5/2008 | Buxton et al. | |
| 2004/0026377 A1 | 2/2004 | Bach et al. | |
| 2004/0097186 A1* | 5/2004 | Eiselt | H02B 13/025 |
| | | | 454/184 |
| 2004/0114289 A1* | 6/2004 | Eiselt | H02B 13/025 |
| | | | 361/62 |
| 2009/0212022 A1* | 8/2009 | Josten | H02B 13/025 |
| | | | 218/157 |
| 2012/0013227 A1* | 1/2012 | Josten | H02B 13/025 |
| | | | 312/109 |
| 2013/0306342 A1* | 11/2013 | Karandikar | H02B 1/565 |
| | | | 174/50 |
| 2013/0327623 A1 | 12/2013 | Kozuru et al. | |
| 2014/0118887 A1* | 5/2014 | Deb | H02B 13/025 |
| | | | 361/622 |
| 2016/0156163 A1* | 6/2016 | Faber | H02B 13/025 |
| | | | 361/605 |
| 2016/0190777 A1* | 6/2016 | Faber | H02B 1/565 |
| | | | 361/641 |
| 2016/0248234 A1 | 8/2016 | Rajauria et al. | |

FOREIGN PATENT DOCUMENTS

| | | |
|---|---|---|
| EP | 1202304 A2 | 5/2002 |
| EP | 1241408 A1 | 9/2002 |
| JP | 4039126 B2 | 1/2008 |

* cited by examiner

SWITCHGEAR ENCLOSURE WITH INTERCONNECTED EXHAUST SYSTEM

BACKGROUND

Embodiments of the present invention relate generally to switchgear, and more particularly, relates to a switchgear enclosure having an interconnected exhaust system.

Switchgear, such as medium voltage ("MV") switchgear, includes various components secured within an enclosed structure. The switchgear enclosure is divided into compartments, such as one or more circuit breaker compartments each housing a circuit breaker, a busbar compartment housing a busbar system, and one or more cable connection compartments. The circuit breakers in the circuit breaker compartments can be electrically connected to the busbar system in the busbar compartment via spouts.

If an arc occurs, such as if a voltage between the conductors within the switchgear exceeds the insulative properties of the insulation between the conductors, or if the conductors are positioned too closely together, an arc flash can release significant energy in the form of heat, intense light, pressure waves, and/or sound waves, sufficient to damage the conductors and adjacent equipment of the switchgear. At least some know switchgears include thicker steel sheeting on the switchgear enclosure and exhausting arc gases from the interior of the switchgear enclosure through an opening at the top of the switchgear enclosure to reduce the effects of an arc flash.

BRIEF DESCRIPTION

In one aspect, a switchgear enclosure is provided. The switchgear enclosure includes a plurality of switchgear panels and a plurality of ducts extending through the switchgear panels. Each switchgear panel includes an exterior housing, a busbar compartment defined within the exterior housing, and an exhaust system. The busbar compartment surrounds a busbar extending through the switchgear panel. The exhaust system includes a vent path structure arranged within the exterior housing to at least partially surround the busbar compartment, a first channel defined between the vent path structure and the exterior housing, and a first vent opening formed on the vent path structure. The first vent opening directs arc gases within said busbar compartment to the first channel. The ducts are in fluid communication with the first channels of the switchgear panels to distribute arc gases between the first channels.

In another aspect, an exhaust system for a switchgear enclosure including a plurality of switchgear panels is provided. The exhaust system includes a plurality of vent path structures, a plurality of first channels, a plurality of first vent openings, and a plurality of ducts extending through the plurality of switchgear panels. Each vent path structure is configured within an exterior housing of one switchgear panel to at least partially surround a busbar compartment defined within the exterior housing. Each first channel is defined between a respective vent path structure and a respective exterior housing. Each first vent opening is formed on a respective vent path structure between the busbar compartment and a respective first channel. The first vent openings direct arc gases within the busbar compartments to the first channels. The ducts are in fluid communication with the first channels to distribute arc gases between the first channels.

In yet another aspect, a method for assembling an exhaust system for a switchgear including a plurality of switchgear panels is provided. The method includes coupling a vent path structure to an exterior housing for each switchgear panel and coupling a first duct through the switchgear panels. The vent path structure at least partially surrounds a busbar compartment of the switchgear panel. The vent path structure includes a first vent opening and a first channel defined between the vent path structure and the exterior housing. The first vent opening provides fluid communication between the first channel and the busbar compartment. The first duct is in fluid communication with the first channel of each switchgear panel to direct arc gases between the first channels.

DETAILED DESCRIPTION

Various embodiments disclosed herein provide arc resistant switchgears with an interconnected exhaust system. More specifically, the switchgears described herein include a plurality of switchgear panels with a vent structure that directs arc gases from within various compartments of the switchgears to a gas duct to be exhausted from the switchgear. The switch gear includes one or more ducts that extend through the vent structures of the switchgear panels to distribute the gases through the switchgear. By distributing the gases, the switchgear may facilitate reducing peak pressure within the switchgear and reducing time to reach the peak pressure.

Figure 1:
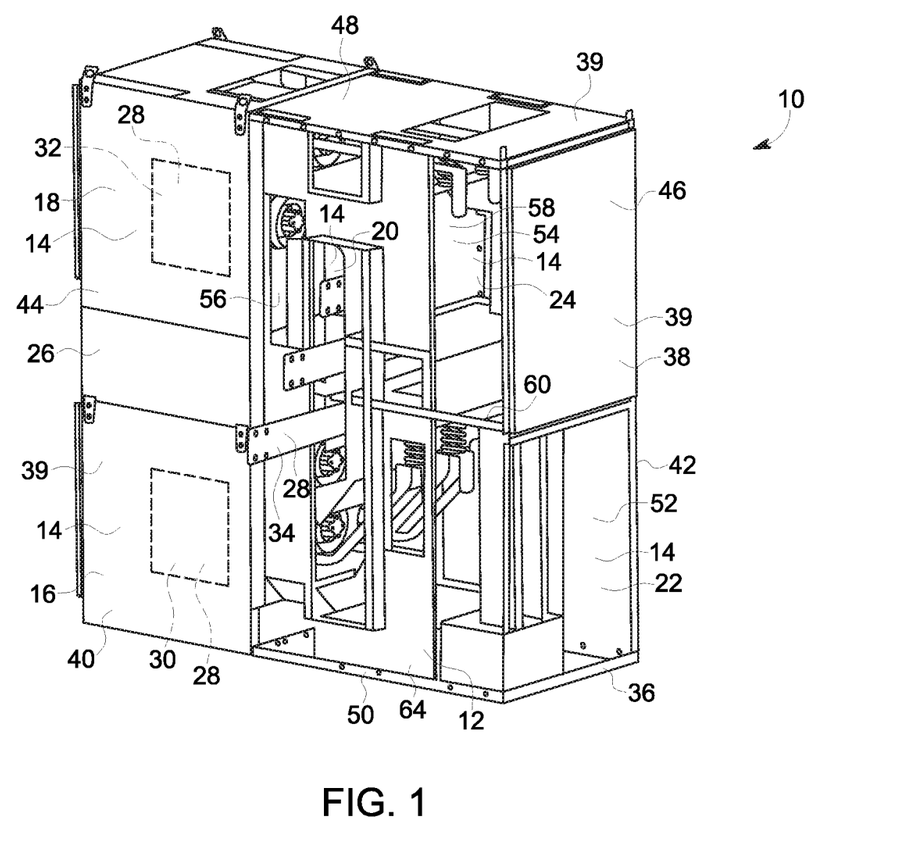
FIG. 1 is a perspective, partially exposed view of an exemplary switchgear.

FIG. 1 illustrates one embodiment of an arc resistant switchgear 10 (also referred to as a "switchgear panel") with an exhaust system 12 to exhaust from multiple compartments 14 to atmosphere. In the exemplary embodiment, compartments 14 include a first (lower) circuit breaker compartment 16, a second (upper) circuit breaker compartment 18, a busbar compartment 20, a first (lower) cable compartment 22, and a second (upper) cable compartment 24. Busbar compartment 20 is disposed between first circuit breaker compartment 16 and first cable compartment 22, and between second circuit breaker compartment 18 and second cable compartment 24. A low voltage compartment 26 may also be interposed between first and second breaker compartments 16, 18. Switchgear 10 may include one or more components 28, such as, but not limited to, first and second circuit breakers 30, 32, a busbar system 34 within busbar compartment 20, and cables (not shown) in first and second cable compartments 22, 24. First and second circuit breakers 30, 32 are disposed in first and second circuit breaker compartments 16, 18. First and second circuit breakers 30, 32 may include wheels so that they can be rolled into and out of their respective compartments 16, 18. Low-voltage compartment 26 may be provided adjacent a front door of switchgear 10 for equipment such as relays, meters, lights, and switches.

Switchgear 10 includes a switchgear enclosure 36 having an exterior housing 38, a plurality of interior partitions 54, and exhaust system 12. In the exemplary embodiment, exterior housing 38 has a rectangular prism shape with a plurality of panels 39 for a first wall 40 (side), a second wall 42 (opposite first wall 40), a third wall 44 (front), a fourth wall 46 (rear), a fifth wall 48 (top), and a sixth wall 50 (bottom). Due to the typical size of switchgear enclosure 36, each wall 40, 42, 44, 46, 48, 50 of exterior housing 38 may include two or more panels 39 as required for structural rigidity. Some panels 39 are shown in FIG. 1, and some of panels 39 are removed from view to expose an interior 52 of switchgear enclosure 36. That is, for illustrative purposes, some exterior panels 39 are removed from view to depict exhaust system 12 within switchgear enclosure 36. However it should be understood that during operation, exterior panels 39 for each wall 40, 42, 44, 46, 48, 50 of enclosure 36 would be in place such that switchgear enclosure 36 encloses components 28 of switchgear 10 therein. Also, some walls 40, 42, 44, 46, 48, 50 may include doors, flappers, apertures, access panels, attachment devices and other features associated with switchgear enclosure 36.

In the exemplary embodiment, interior 52 includes interior partitions 54 for dividing adjacent compartments 14 from each other. Interior partitions 54 include a plurality of partitions 56, 58, 60. Partition 56 is arranged to separate first and second circuit breaker compartments 16, 18 from busbar compartment 20 and first and second cable compartments 22, 24. Partition 58 is arranged to separate busbar compartment 20 from first and second cable compartments 22, 24. Partition 60 is arranged to separate first cable compartment 22 from second cable compartment 24. Although only partitions 56, 58, 60 are shown, it is to be understood that other partitions may be included in interior 52.

With reference again to FIG. 1, exhaust system 12 is designed and placed in switchgear housing 38 in such a way that, in an event of internal arc, the high pressure and temperature gases are guided through a network of passages and channels inside switchgear 10 so that it can be safely exhausted without creating a high pressure and temperature environment inside switchgear enclosure 36. Exhaust system 12 is designed in such a way that compartments 14 during an arcing event can be employed at the same time to share the pressure and exhaust the high pressure and temperature gases to outside atmosphere, thus mitigating potential damage to switchgear 10 and limiting the possibility of danger to personnel in proximity. Exhaust system 12 further assists in limiting the escape of arc gases to adjacent compartments 14 by utilizing channels as will be described below.

Figure 2:
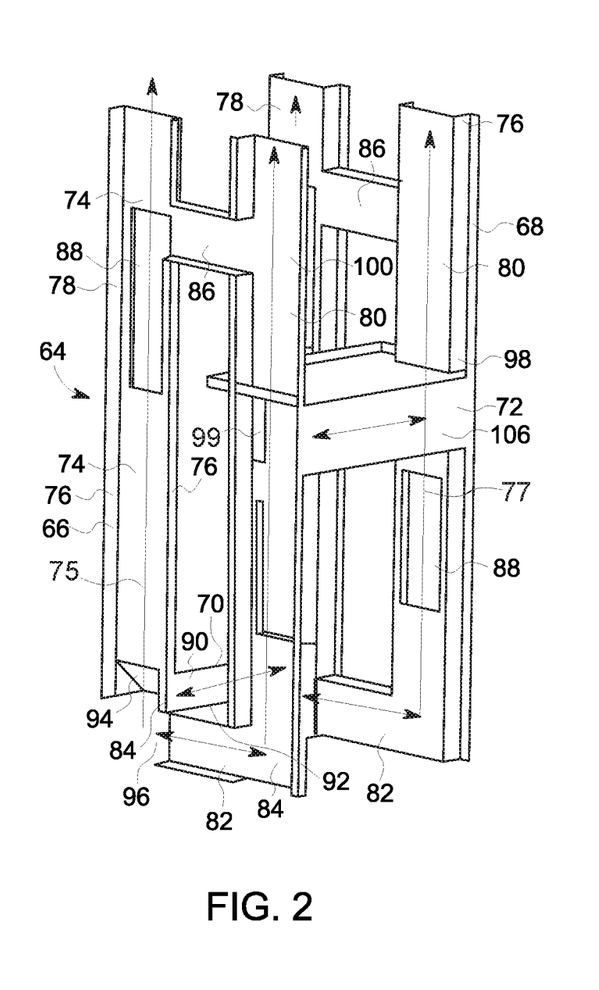
FIG. 2 is a perspective view of an exemplary vent path structure for use in the switchgear of FIG. 1.
Figure 3:
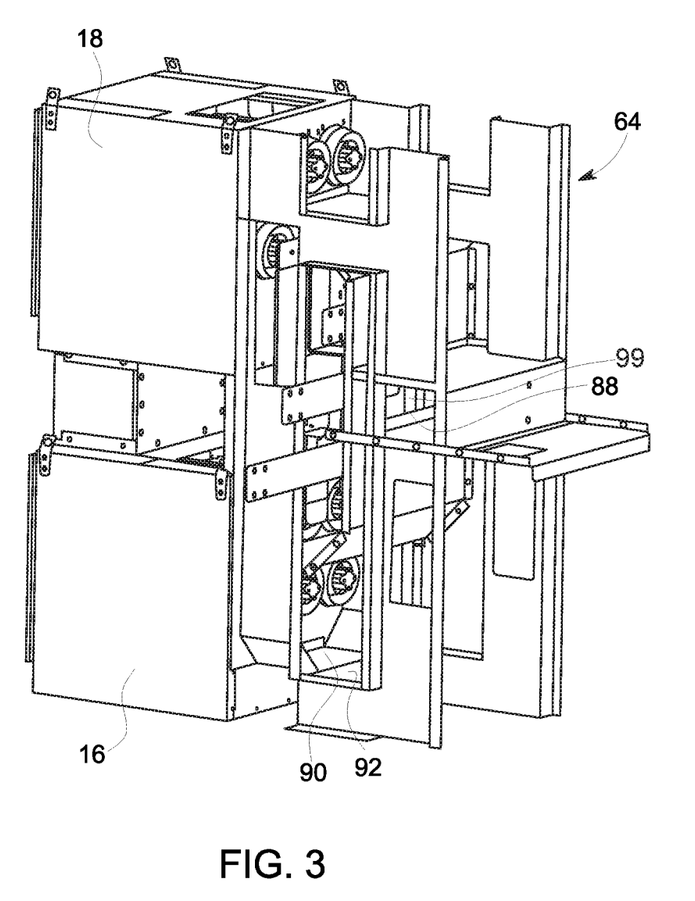
FIG. 3 is a perspective view of the vent path structure of FIG. 2 assembled onto a portion of the switchgear of FIG. 1.

Exhaust system 12 includes a universal vent path structure 64, shown outside of switchgear enclosure 36 in FIG. 2, that can be added to the rear of first and second breaker compartments 16, 18 as shown in FIG. 3, and partially surround sides of busbar compartment 20 and first and second cable compartments 22, 24 (FIG. 1). While features of vent path structure 64 will be separately described below, vent path structure 64 may be a modular structure that can be inserted into switchgear 10 as an integral unit. Vent path structure 64 is in fluid communication with first breaker compartment 16 and other compartments 14 of switchgear 10 in such a way that guides or directs the exhaust pressure gases through a flap or any other pre-defined opening mechanism to the entry point at an adjacent compartment 14 in switchgear 10.

With further reference to FIG. 2, in the exemplary embodiment, vent path structure 64 of exhaust system 12 includes first and second opposing vent path sides 66, 68, a third vent path side 70 connected between first and second vent path sides 66, 68, and a fourth vent path side 72 connected between first and second vent path sides 66, 68. First and second opposing vent path sides 66, 68 each include a substantially U-shaped cross-section to direct arc gases, such as by including a plate-like portion 74 with two protruding ridges 76 on longitudinal sides of plate-like portion 74. When first vent path side 66 is positioned adjacent first side wall 40 of exterior housing 38, a space is enclosed between first side wall 40 and first vent path side 66 to form a channel 75 that extends substantially from bottom wall 50 to top wall 48 of exterior housing 38. Likewise, when second vent path side 68 is positioned adjacent second side wall 42 of exterior housing 38, a space is enclosed between second side wall 42 and second vent path side 68 to form a channel 77 that extends substantially from bottom wall 50 to top wall 48 of exterior housing 38. First and second opposing vent path sides 66, 68 also may include first and second substantially longitudinally extending parallel portions 78, 80 and a third portion 82 connected to first and second portions 78, 80 to fluidly connect channels 75, 77 of first and second portions 78, 80. Third portion 82 may extend substantially perpendicular to first and second portions 78, 80 as shown. Third portion 82 is connected to bottom end areas 84 of first and second portions 78, 80. First and second vent path sides 66, 68 may further include a fourth portion 86 spaced from third portion 82 and which also fluidly connects first and second portions 78, 80. First portion 78 may be spaced from the bottom wall 50, as will be further described below. First and second portions 78, 80 may further include apertures or vent openings 88 for enabling arc gases to vent from compartments 14 to channels 75, 77 defined between first and second vent path sides 66, 68 and first and second walls 40, 42.

Third vent path side 70 connects first portions 78 of first and second vent path sides 66, 68. Third vent path side 70 extends substantially parallel to third and fourth walls 44, 46 of exterior housing 38. Third vent path side 70 is connected to an end area 84 of first portions 78 of first and second vent path sides 66, 68, adjacent bottom wall 50. In use, third vent path side 70 is disposed in first cable compartment 22. Third vent path side 70 includes a first barrier section 90 substantially parallel to top and bottom walls 48, 50, and a second barrier section 92 substantially parallel to front and rear walls 44, 46. There may further be one or more transition sections 94 between first and second vent path sides 66, 68 and third vent path side 70. Third vent path side 70 is thus arranged to at least partially form a channel 96 between third vent path side 70 and sixth wall 50, and channel 96 is fluidly connected to channels 75, 77 between first and second vent path sides 66, 68 and first and second side walls 40, 42, respectively.

Fourth vent path side 72 is connected to a central area 98 of second portions 80 of first and second vent path sides 66, 68. Central area 98 of second portions 80 of first and second vent path sides 66, 68 is located between end area 84 of second portions 80 to which third portion 82 is connected, and area 100 of second portions 80 to which fourth portion 86 is connected. Fourth vent path side 72 fluidly connects second portions 80 of first and second vent path sides 66, 68 via apertures 99 in second portions 80. In use, fourth vent path side 72 is disposed in second cable compartment 24. Fourth vent path side 72 includes a first barrier section 104 substantially parallel to fifth and sixth walls 48, 50, and a second barrier section 106 substantially parallel to third and fourth walls 44, 46.

Figure 4:
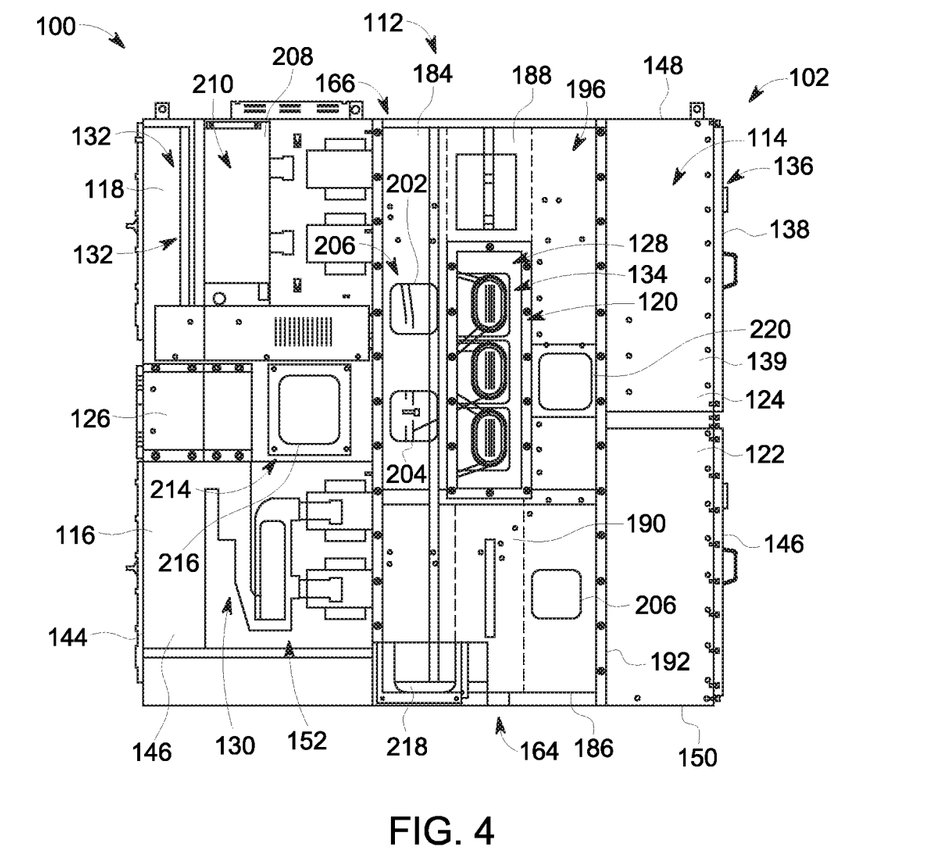
FIG. 4 is a side perspective view of an exemplary switchgear.
Figure 5:
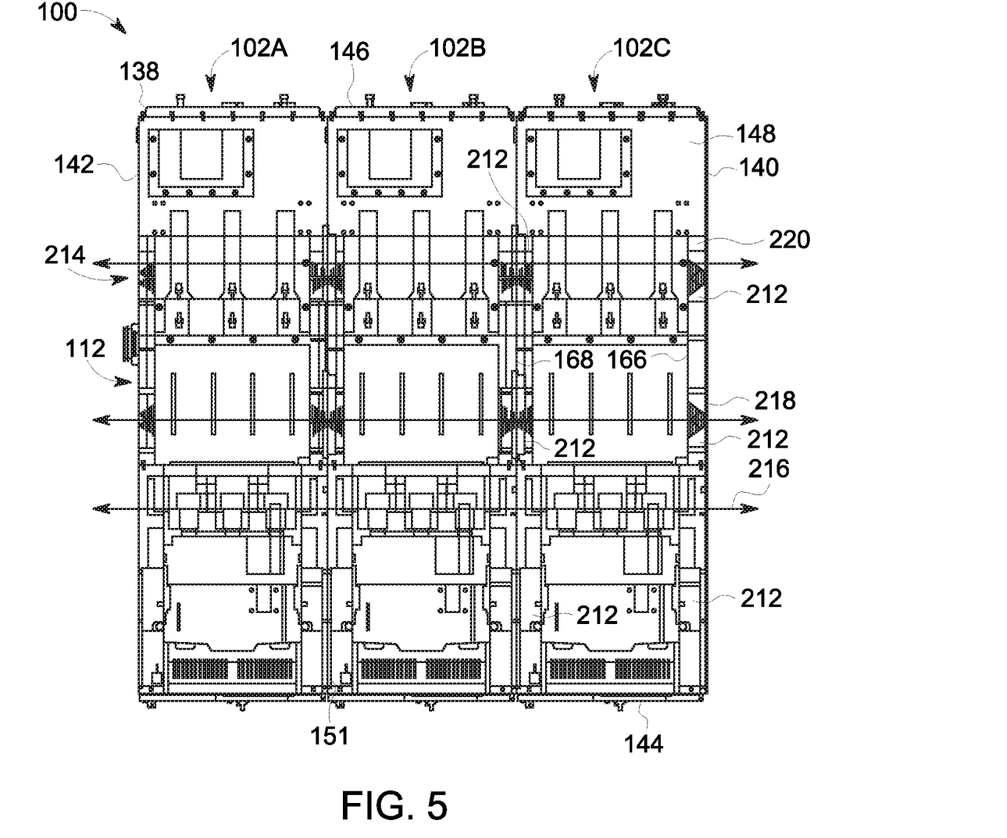
FIG. 5 is a top plan view of the switchgear shown in FIG. 4.
Figure 6:
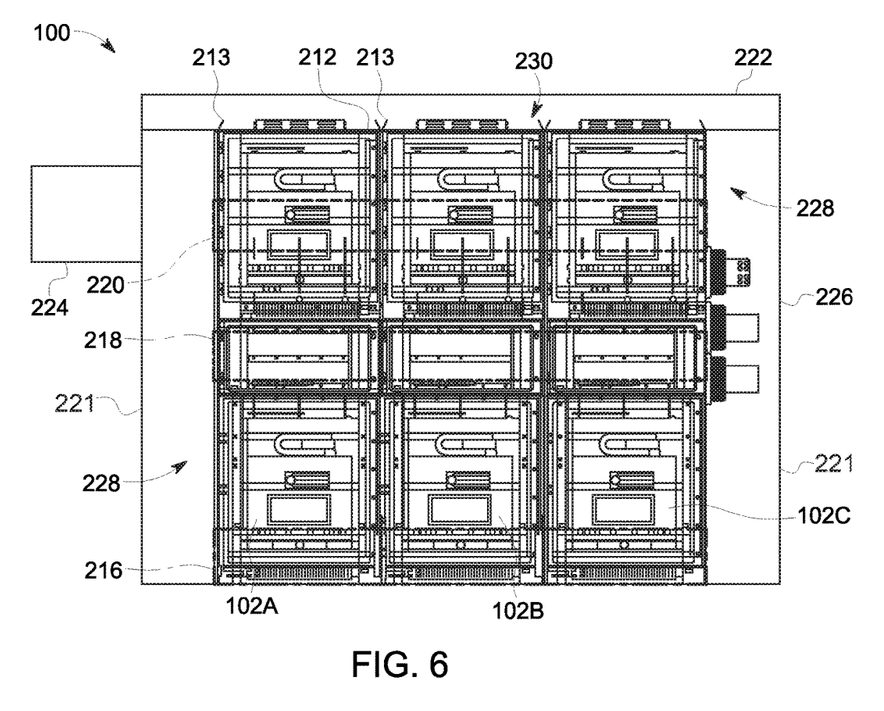
FIG. 6 is a front view of the switchgear shown in FIG. 4.

With reference to FIGS. 4-6, another exemplary arc resistant switchgear 100 is provided. Switchgear 100 includes a plurality of switchgear panels 102 positioned adjacent to each other. In the illustrated embodiment, switchgear 100 includes three switchgear panels 102. In other embodiments, switchgear 100 may include a different number of switchgear panels 102 (including one). Each switchgear panel 102 may be similar to switchgear 10 (shown in FIG. 1). Alternatively, switchgear panels 102 may have a different configuration. In some embodiments, switchgear panels 102 are integrally formed with each other. In other embodiments, switchgear panels 102 are separate components coupled to each other.

FIG. 4 is a side view of switchgear 100. That is, only one switchgear panel 102 is illustrated. Similar to switchgear 10, switchgear panel 102 includes an exhaust system 112 and a plurality of compartments 114. Compartments 114 include, for example, a first (lower) circuit breaker compartment 116, a second (upper) circuit breaker compartment 118, a busbar compartment 120, a first (lower) cable compartment 122, and a second (upper) cable compartment 124. Switchgear panel 102 may also include a low voltage compartment 126 between first circuit breaker compartment 116 and second circuit breaker compartment 118. Exhaust system 112 is positioned to substantially surround busbar compartment 120. In certain embodiments, exhaust system 112 at least partially defines busbar compartment 120. Exhaust system 112 and busbar compartment 120 are positioned between circuit breaker compartments 116, 118 and cable compartments 122, 124.

Switchgear panel 102 may include one or more components 128, such as, but not limited to, first and second circuit breakers 130, 132, a busbar system 134 within busbar compartment 120, and cables (not shown) in first and second cable compartments 122, 124. First and second circuit breakers 130, 132 are disposed in first and second circuit breaker compartments 116, 118. First and second circuit breakers 130, 132 may include wheels so that they can be rolled into and out of their respective compartments 116, 118. Low-voltage compartment 126 may be provided adjacent a front door of switchgear 10 for equipment such as relays, meter, lights, and switches.

Switchgear 100 includes a switchgear enclosure 136 that has an exterior housing 138 and exhaust system 112. Exterior housing 138 includes panels 139 for a first side wall 140, a second side wall 142 (shown in FIG. 5), a front wall 144, a rear wall 146, a top wall 148, and a bottom wall 150. Due to the typical size of the switchgear enclosure 136, each wall 140, 142, 144, 146, 148, 150 of the exterior housing 138 may include two or more panels 139 as required for structural rigidity. In the exemplary embodiment, switchgear enclosure 136 includes two partition walls 151 (shown in FIG. 5) between adjacent switchgear panels 102. Panels 139 are shown as translucent for illustrative purposes. That is, panels 139 are shown as translucent to expose an interior 152 of switchgear enclosure 136. In some embodiments, one or more walls 140, 142, 144, 146, 148, 150 may include doors, flappers, apertures, access panels, attachment devices and other features associated with switchgear enclosure 136. Interior 152 may include one or more interior partitions for dividing adjacent compartments 114 from each other.

Exhaust system 112 is configured to, in the event of an internal arc, direct or guide high pressure and temperature gases ("arc gases") away from interior 152 to prevent damage to components 128 due to an arc flash. Exhaust system 112 typically guides the arc gases to the outer atmosphere to dissipate. Each switchgear panel 102 includes a portion of exhaust system 112 to exhaust the arc gases. Similar to exhaust system 12 (shown in FIG. 1), exhaust system 112 includes various openings and channels in communication with each compartment 114 to distribute the arc gases through exhaust system 112. The openings and channels enable exhaust system 112 to direct the arc gases without creating a high pressure and/or temperature environment within enclosure 136, and more specifically, exhaust system 112.

In the exemplary embodiment, exhaust system 112 includes a vent path structure 164 for each switchgear panel 102. Vent path structure 164 includes a first vent path side 166 and an opposing second vent path side 168 (shown in FIG. 5). In the exemplary embodiment, vent path sides 166, 168 have the same configuration. Although only vent path side 166 is described herein, it is to be understood that vent path side 168 may include a corresponding component or configuration. In other embodiments, vent path sides 166, 168 may have different configurations. In the exemplary embodiment, vent path side 166 includes two opposing vertical members 184, 186 and two opposing horizontal members 188, 190 coupled between vertical members 184, 186.

An outer edge 192 and an inner edge 194 of vent path side 166 is coupled to first side wall 140. In the exemplary embodiment, vent path side 166 extends inwardly towards vent path side 168 to form an internal space or cavity between vent path side 166 and first side wall 140. One or more channels 196 are defined within the internal space. Channels 196 are formed between each vertical member 184, 186 and exterior housing 138 in addition to between each horizontal member 188, 190 and exterior housing 138. Channels 196 are in fluid communication with each other to distribute and direct arc gases through exhaust system 112 away from enclosure 136 as described herein.

In the exemplary embodiment, vent path side 166 includes a busbar opening 198 to enable busbar system 134 to extend through switchgear 100. Vent path side 166 further includes one or more vent path side openings 200. Vent path side openings 200 provide compartments 114 fluid access to channels 196. Vent path side openings 200 enable exhaust system 112 to collect or receive arc gases from compartments 114 while keeping vent path structure 164 generally sealed. Keeping vent path structure 164 facilitates improved control of the flow direction of the arc gases away from enclosure 136. In at least some embodiments, vent path side openings 200 may include flaps, doors, mesh, or other features to selectively provide fluid access to channels 196.

In the exemplary embodiment, vent path side 166 includes a first vent path side opening 202, a second vent path side opening 204, and a third vent path side opening 206. It is to be understood that vent path side openings 202, 204, 206 are shown for exemplary purposes only and that a different number, shape, and configuration of vent path side openings may be used in the embodiments described herein.

First and second vent path side openings 202, 204 are formed within vertical member 184. First and second vent path side openings 202, 204 are configured to provide fluid communication between busbar compartment 120 and channels 196. In some embodiments, first and second vent path side openings 202, 204 may also be in fluid communication with first and second breaker compartments 116, 118. Third vent path side opening 206 is formed within vertical member 186. Third vent path side opening 206 is configured to provide fluid communication between channels 196 and at least first cable compartment 122. In at least some embodiments, third vent path side opening 206 further provides fluid access to channels 196 for other compartments 114, such as second cable compartment 124.

In the exemplary embodiment, vent path structure 164 further includes a breaker vent structure 208 positioned adjacent to second circuit breaker compartment 118. Breaker vent structure 208 is coupled to first wall 140 and/or second wall 142 to form a breaker channel 210. In at least some embodiments, breaker channel 210 is in fluid communication with channels 196 of vent path structure 164. Breaker vent structure 208 is configured to direct or guide arc gases from enclosure 136 through breaker channel 210 to the outside atmosphere. More specifically, breaker vent structure is configured to direct arc gases from first breaker compartment 116, second breaker compartment 118. Breaker vent structure 208 may include openings, flaps, doors, and the like to facilitate selective fluid access to breaker channel 210 from enclosure 136.

Each switchgear panel 102 includes at least one external opening for exhaust system 112. In the exemplary embodiment, switchgear panels 102 include three opposing pairs of external openings 212 (shown in FIG. 5). External openings are in fluid communication with channels 196 and breaker channel 210 to enable the arc gases to be guided away from enclosure 136 to the outside atmosphere. In some embodiments, external openings 212 include a flap, a door, or a different component to provide selective fluid access from exhaust system 112 to the outside atmosphere. In the exemplary embodiment, each external opening 212 include a flap 213 (shown in FIG. 6) configured to provide selective fluid access. Flap 213 is forced open by the arc gases when the arc gases reach a predetermined pressure or other threshold.

In the exemplary embodiment, switchgear 100 further includes one or more ducts 214 that extend through each switchgear panel 102. Ducts 214 are in fluid communication with channels 196 and breaker channel 210 of each switchgear panel 102 to distribute the arc gases through exhaust system 112. By distributing the arc gases, ducts 214 facilitate reduced pressure and temperature of the arc gases through exhaust system 112.

For example, with reference now to FIG. 5, switchgear 100 includes three switchgear panels 102A-102C. If an arc event occurs within switchgear panel 102A, ducts 214 distribute the arc gases of the arc event to switchgear panels 102B and 102C. The increased pressure of the arc gases within switchgear panel 102A relative to the pressure within switchgear panels 102B and 102C may cause at least a portion of the arc gases to travel through ducts 214. The arc gases are directed through channels 196 and breaker channel 210 (both shown in FIG. 4) towards external openings 212 of each switchgear panel 102A-102C to prevent pressures and temperatures in exhaust system 112 that may damage switchgear 100.

In some embodiments, ducts 214 are continuous through switchgear panels 102A-102C. Ducts 214 may include side openings in communication with channels 196 and/or breaker channel 210. Additionally or alternatively, each duct 214 may include a plurality of portions coupled together. For example, each switchgear panel 102A-102C may include a portion of ducts 214. The portions may be sealed together (e.g., using a rubber seal) to prevent fluid access to ducts 214 external to exhaust system 112.

In the exemplary embodiment, with reference to FIG. 4, switchgear 100 includes three ducts 214. A first duct 216 is positioned adjacent breaker vent structure 208 and low voltage compartment 126. First duct 216 may be in fluid communication with channels 196 and/or breaker channel 210. A second duct 218 is positioned adjacent to bottom wall 150 through vertical member 184. Second duct 218 may be in fluid communication with channels 196 and/or first breaker compartment 116. A third duct 220 extends through vertical member 186 adjacent to busbar compartment 120 and second cable compartment 124. Third duct 220 may be in fluid communication with channels 196, busbar compartment 120, first cable compartment 122, and/or second cable compartment 124. Although first duct 216, second duct 218, and third duct 220 are shown, it is to be understood that a different number, shape, size, and/or configuration of ducts 214 may be used in the embodiments described herein.

With reference now to FIG. 6, switchgear 100 may further include opposing side panels 221, an external gas duct 222, and an enclosure exhaust 224. Switchgear panels 102A-102C are positioned between side panels 221. In the exemplary embodiment, side panels 221 include an external housing 226 that defines a pair of side channels 228 between external housing 226 and side walls 142, 140 of switchgear panels 102A and 102C, respectively. Side channels 228 are in fluid communication with ducts 214 to distribute the arc gases.

In the exemplary embodiment, gas duct 222 is coupled to side panels 221 and extends along top wall 148 of switchgear panels 102A-102C. Gas duct 222 defines a gas channel 230 that extends between side channels 228. Gas channel 230 is in fluid communication with channels 196 and breaker channel 210 of each switchgear panel 102A-102C through external openings 212. Enclosure exhaust 224 is configured to receive the arc gases from side channels 228 and gas channel 230 and transfer the arc gases to the outside atmosphere. In certain embodiments, enclosure exhaust 224 includes a mesh or filter to remove particles (e.g., pollutants) from the arc gases before transferring to the outside atmosphere.

Figure 7:
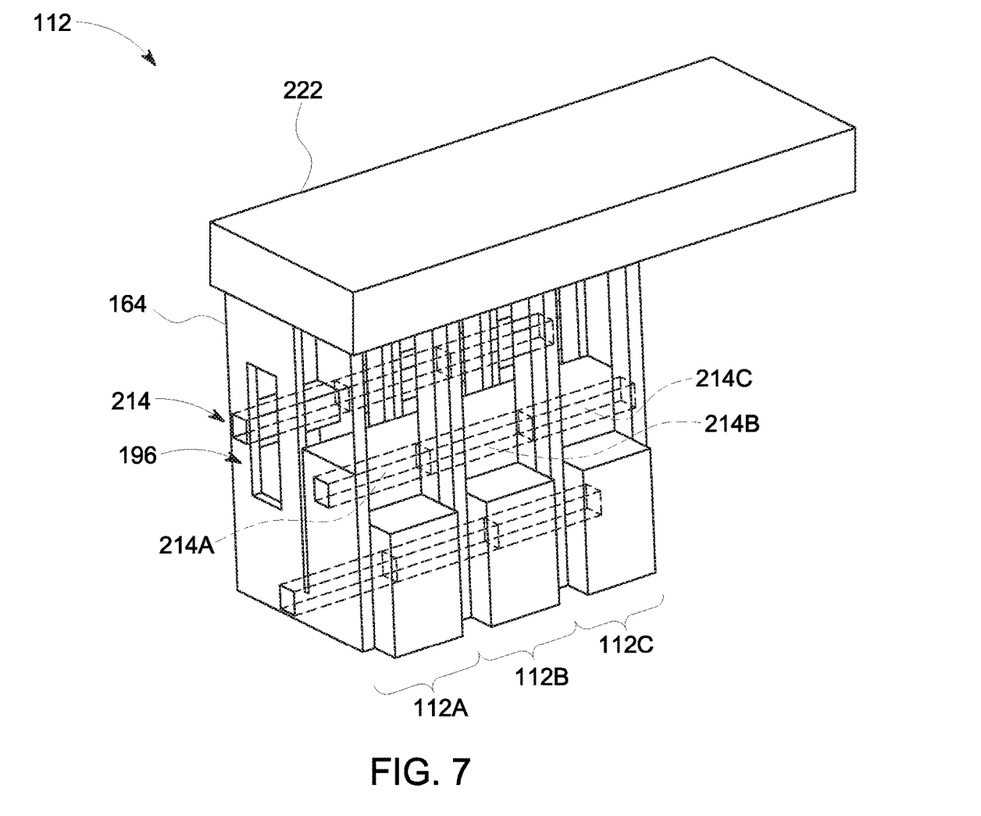
FIG. 7 is a perspective view of an exemplary exhaust system air volume available in the switchgear shown in FIG. 4.
Figure 8:
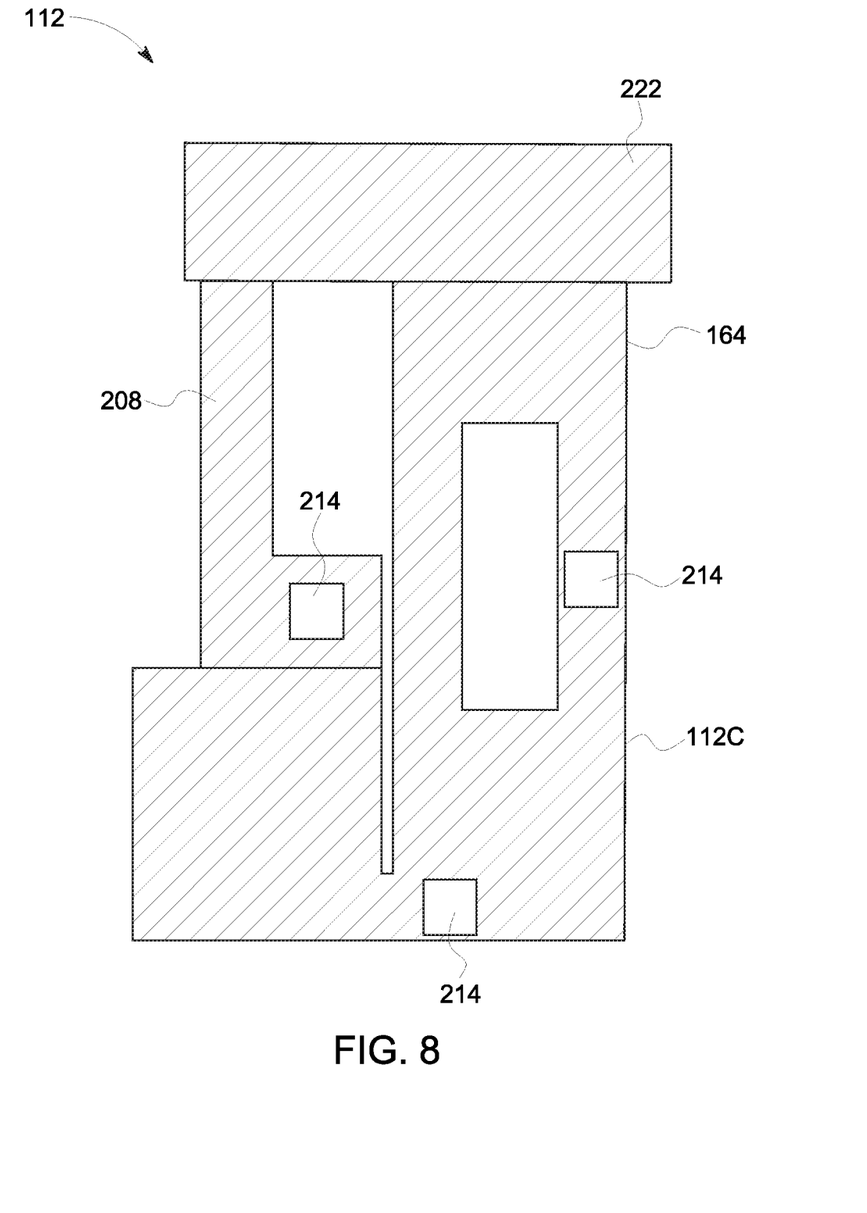
FIG. 8 is a side view of the exemplary exhaust system air volume shown in FIG. 7.
Figure 9:
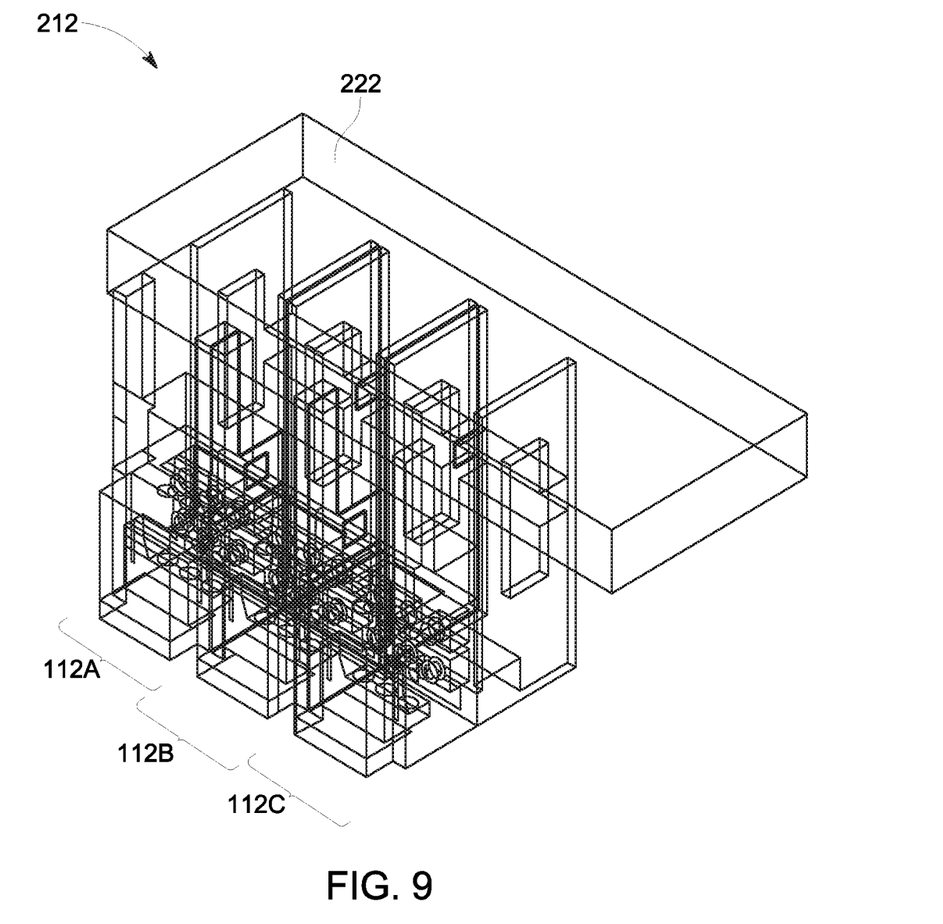
FIG. 9 is a transparent perspective view of the exemplary exhaust system air volume shown in FIG. 7.
Figure 10:
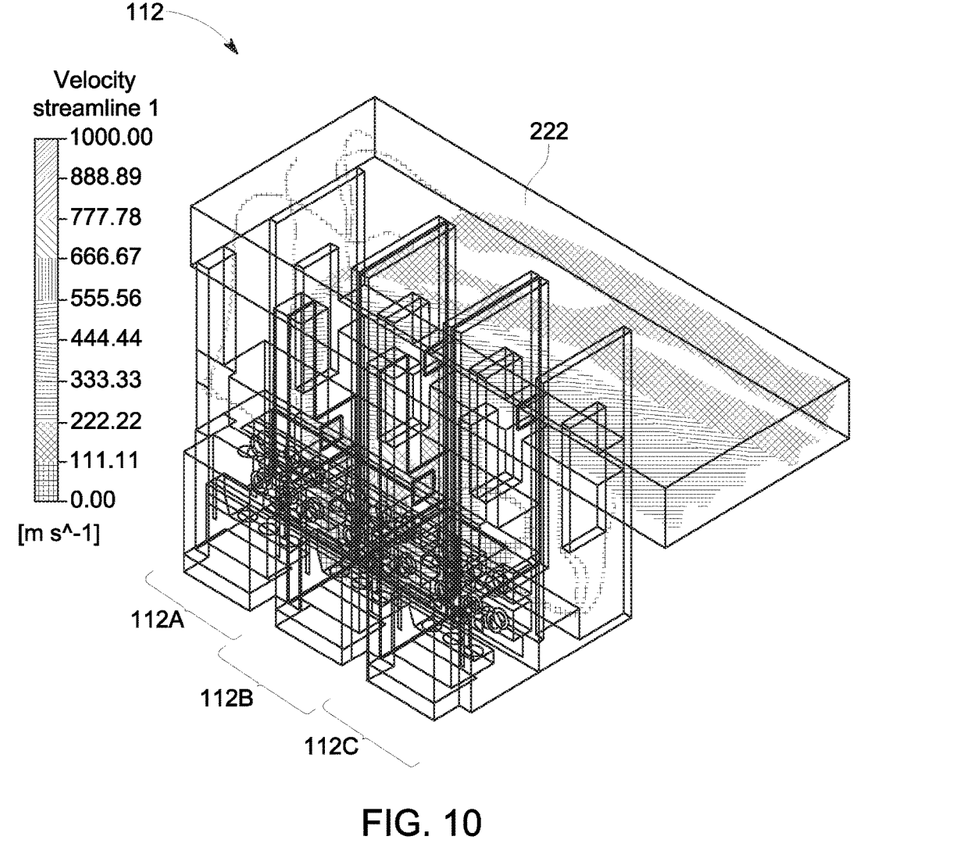
FIG. 10 is a transparent perspective view of the exemplary exhaust system shown in FIG. 7 with fluid streamlines.

FIGS. 7-10 illustrate exhaust system 112 of switchgear 100 (shown in FIGS. 4-6). More particularly, FIG. 7 is a perspective view of exhaust system 112, FIG. 8 is a side view of exhaust system 112, FIG. 9 is a transparent perspective view of exhaust system 112, and FIG. 10 is a transparent perspective view of exhaust system 112 with fluid streamlines. Although exhaust system 112 is shown as solid shapes in FIGS. 7 and 8, it is to be understood that channels 196 and breaker channel 210 are defined within the solid shapes are shown in FIGS. 9 and 10.

In the exemplary embodiment, exhaust system 112 has three separate portions 112A-112C coupled together for switchgear panels 102A-102C (shown in FIG. 5). Ducts 214 include a first duct portion 214A, a second duct portion 214B, and a third duct portion 214C. Duct portions 214A-214C are sealed together using a rubber seal or another suitable sealing material or method.

With reference to FIG. 8, each vent path structure 164 includes ducts 214 and breaker vent structure 208. Vent path structure 164 is positioned adjacent to gas duct 222 to facilitate directing the arc gases away from switchgear 100.

In one example shown in FIGS. 9 and 10, an arc event occurs in switchgear panel 102B (shown in FIG. 5). Although a portion of the resulting arc gases are guided through portion 112B of exhaust system 112 to gas duct 222, ducts 214 distribute the remaining arc gases to portions 112A and 112C of exhaust system 112 to reduce a pressure and a temperature of the arc gases in exhaust system 112.

The embodiments described above provide an arc resistant switchgear with an exhaust system for directing arc gases from an enclosure of the switchgear to the outside atmosphere. The exhaust system includes a plurality of labyrinth channels that distribute the arc gases to facilitate reduced pressure and temperature of the arc gases while in the exhaust system. The exhaust system further includes one or more ducts that facilitate distribution of the arc gases between switchgear panels. Distributing the arc gases may reduce the pressure and temperature of the arc gases in addition to the time taken to dissipate the arc gases within the enclosure. Reducing the pressure and temperature of the arc gases may facilitate reduced damage to the switchgear due to the arc gases exploding, causing another arc event, and the like.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A switchgear enclosure comprising a plurality of switchgear panels and a plurality of ducts extending through said plurality of switchgear panels, each switchgear panel of said plurality of switchgear panels comprising:
    an exterior housing;
    a busbar compartment defined within said exterior housing and surrounding a busbar extending through said switchgear panel; and
    an exhaust system comprising:
        a vent path structure positioned within said exterior housing to at least partially surround said busbar compartment;
        a first channel defined between said vent path structure and said exterior housing; and
        a first vent opening formed on said vent path structure between said busbar compartment and said first channel, said first vent opening providing fluid communication between said busbar compartment and said first channel to direct arc gases within said busbar compartment to said first channel,
    wherein the plurality of ducts are in fluid communication with said first channels of said plurality of switchgear panels to distribute arc gases between said first channels of said plurality of switchgear panels.

2. The switchgear enclosure of claim 1, wherein said switchgear enclosure further comprises a gas duct in fluid communication with said first channels of said plurality of switchgear panels and an enclosure exhaust, said gas duct providing fluid communication between said first channels and said enclosure exhaust to direct the arc gases from said first channel to said enclosure exhaust.

3. The switchgear enclosure of claim 2, further comprising a flap for said each switchgear panel, said flap positioned between said first channel and said gas duct, wherein said flap is selectively moveable to provide fluid communication between said first channel and said gas duct.

4. The switchgear enclosure of claim 1, wherein said first vent opening further comprises a flap that is selectively moveable to provide fluid communication between said busbar compartment and said first channel.

5. The switchgear enclosure of claim 1, wherein said exterior housing comprises a first wall and an opposing second wall, said vent path structure further comprising:
    a first vent path side extending between said first wall and said busbar compartment; and
    a second vent path side extending between said second wall and said busbar compartment, wherein said plurality of ducts are coupled to each of said first vent path side and said second vent path side.

6. The switchgear enclosure of claim 1, wherein each switchgear panel of said plurality of switchgear panels further comprises:
    a breaker compartment defined with said exterior housing, said breaker compartment housing a circuit breaker; and
    a second vent opening formed in said vent path structure between said breaker compartment and said first channel.

7. The switchgear enclosure of claim 6, wherein each exhaust system further comprises:
    a breaker vent path structure coupled to said exterior housing adjacent to said breaker compartment;
    a breaker channel defined between said breaker vent path structure and said exterior housing, said breaker channel in fluid communication with said first channel; and
    a breaker opening formed in said breaker vent path structure, said breaker opening providing fluid access from said breaker compartment to said breaker channel.

8. The switchgear enclosure of claim 7, wherein a first duct of said plurality of ducts is in fluid communication with said breaker channels of said plurality of switchgear panels.

9. The switchgear enclosure of claim 1, wherein each switchgear panel of said plurality of switchgear panels further comprises:
    a cable compartment defined with said exterior housing; and
    a second vent opening formed in said vent path structure between said breaker compartment and said first channel.

10. An exhaust system for a switchgear enclosure including a plurality of switchgear panels, said exhaust system comprising:
    a plurality of vent path structures, each vent path structure of said plurality of vent path structures positioned within an exterior housing of one switchgear panel of the plurality of switchgear panels to at least partially surround a busbar compartment defined within the exterior housing;
    a plurality of first channels, each first channel of said plurality of first channels defined between a respective vent path structure of said plurality of vent path structures and a respective exterior housing;
    a plurality of first vent openings, each first vent opening of said plurality of first vent openings formed on said respective vent path structure between the busbar compartment and a respective first channel of said plurality of first channels, said first vent opening providing fluid communication between the busbar compartment and said first channel to direct arc gases within the busbar compartment to said first channel; and
    a plurality of ducts extending through the plurality of switchgear panels, the plurality of ducts in fluid communication with said plurality of first channels to distribute arc gases between said plurality of first channels of said plurality of switch gear panels.

11. The exhaust system of claim 10, further comprising a gas duct in fluid communication with said plurality of first channels and an enclosure exhaust, said gas duct providing fluid communication between said plurality of first channels and said enclosure exhaust to direct the arc gases from said plurality of first channels to said enclosure exhaust.

12. The exhaust system of claim 11, further comprising a flap for each switchgear panel, said flap positioned between said respective first channel of said plurality of first channels and said gas duct, wherein said flap is selectively moveable to provide fluid communication between said respective first channel and said gas duct.

13. The exhaust system of claim 10, wherein each first vent opening of said plurality of first vent openings further includes a flap that is selectively moveable to provide fluid communication between the busbar compartment and said respective first channel.

14. The exhaust system of claim 10, wherein the exterior housing includes a first wall and an opposing second wall, each vent path structure of said plurality of vent path structures further comprising:
a first vent path side extending between the first wall and the busbar compartment; and
a second vent path side extending between the second wall and the busbar compartment, wherein said plurality of ducts are coupled to each of said first vent path side and said second vent path side.

15. The exhaust system of claim 10, wherein each vent path structure of said plurality of vent path structures further comprises a second vent opening formed in said vent path structure between a breaker compartment defined within the exterior housing and said respective first channel.

16. The exhaust system of claim 15, further comprising:
a plurality of breaker vent path structures, each breaker vent path structure of said plurality of breaker vent path structures coupled to the exterior housing of a respective switchgear panel adjacent to the breaker compartment;
a plurality of breaker channels defined between said plurality of breaker vent path structures and the exterior housings of the plurality of switchgear panels, each breaker channel of said plurality of breaker channels in fluid communication with at least one first channel of said plurality of first channels; and
a plurality of breaker openings formed in said plurality of breaker vent path structures, said plurality of breaker openings providing fluid communication between the breaker compartments of the plurality of switchgear panels and said plurality of breaker channels.

17. The exhaust system of claim 16, wherein a first duct of said plurality of ducts is in fluid communication with said plurality of breaker channels.

18. The exhaust system of claim 10, wherein each vent path structure of said plurality of vent path structures further comprises a second vent opening formed in said vent path structure between a cable compartment defined within the respective exterior housing and said respective first channel.

19. A method for assembling an exhaust system for a switchgear comprising a plurality of switchgear panels, the method comprising:
coupling a vent path structure to an exterior housing for each switchgear panel of the plurality of switchgear panels, the vent path structure at least partially surrounding a busbar compartment of the switchgear panel, wherein the vent path structure includes a first vent opening and a first channel defined between the vent path structure and the exterior housing, and wherein the first vent opening provides fluid communication between the first channel and the busbar compartment; and
coupling a first duct through the plurality of switchgear panels, the first duct in fluid communication with the first channel of each switchgear panel to direct arc gases between the first channels of the plurality of switchgear panels.

20. The method of claim 19, further comprising:
coupling a breaker vent path structure to the exterior housing for each switchgear panel of the plurality of switchgear panels, the breaker vent path structure at least partially surrounding a breaker compartment, wherein a breaker channel is defined between the breaker vent path structure and the exterior housing, the breaker channel in fluid communication with the first channel; and
coupling a second duct to the breaker vent path structures of the plurality of switchgear panels, the second duct in fluid communication with the breaker channel of each switchgear panel of the plurality of switchgear panels.

* * * * *